US011343180B2

(12) United States Patent
Baruah et al.

(10) Patent No.: US 11,343,180 B2
(45) Date of Patent: May 24, 2022

(54) NETWORK SERVICE ACCESS AND DATA ROUTING BASED ON ASSIGNED CONTEXT

(71) Applicant: Cisco Technology, Inc., San Jose, CA (US)

(72) Inventors: Pritam Baruah, San Jose, CA (US); Gaurav Shrivastava, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/091,478

(22) Filed: Nov. 6, 2020

(65) Prior Publication Data

US 2022/0052947 A1    Feb. 17, 2022

Related U.S. Application Data

(60) Provisional application No. 63/065,932, filed on Aug. 14, 2020.

(51) Int. Cl.
*H04L 45/64* (2022.01)
*H04L 45/30* (2022.01)
*H04L 12/46* (2006.01)
*H04L 29/06* (2006.01)

(52) U.S. Cl.
CPC .......... *H04L 45/64* (2013.01); *H04L 12/4633* (2013.01); *H04L 45/30* (2013.01); *H04L 63/029* (2013.01); *H04L 63/0272* (2013.01)

(58) Field of Classification Search
None
See application file for complete search history.

(56) References Cited

U.S. PATENT DOCUMENTS

| 8,621,596 | B2 | 12/2013 | Smith | |
|---|---|---|---|---|
| 10,417,025 | B2 * | 9/2019 | Bosch | H04L 67/10 |
| 2015/0012832 | A1 * | 1/2015 | Vangala | G06F 3/0482 |
| | | | | 715/736 |
| 2015/0281073 | A1 * | 10/2015 | Kotha | H04L 49/25 |
| | | | | 370/392 |
| 2016/0226794 | A1 * | 8/2016 | Rao | H04L 12/4641 |

(Continued)

OTHER PUBLICATIONS

Rozic et al. "Network Primitives Based on Latency and Recovery Time in Orchestrated Multi-Layer Networks" published 2017 (Year: 2017).*

(Continued)

*Primary Examiner* — Scott B Christensen
(74) *Attorney, Agent, or Firm* — Polsinelli PC

(57) ABSTRACT

The present technology discloses methods, systems, and non-transitory computer-readable media for defining, for a network primitive in a network domain, whether the network primitive can receive data carrying an assigned context associated from one or more source nodes through a software-defined wide area network (SDWAN) fabric overlay; advertising a capability of the network primitive, the capability stating whether the network primitive can receive the data carrying the assigned context; and controlling selective transmission of the data carrying the assigned context from the one or more source nodes to the network primitive through the SDWAN fabric overlay based on the capability of the network primitive to receive the data carrying the assigned context.

20 Claims, 8 Drawing Sheets

Define whether a network primitive in a network domain can receive data carrying an assigned context from one or more source nodes through a software-defined wide area network (SDWAN) fabric overlay
600

Advertise a capability of the network primitive stating whether the network primitive can receive the data carrying the assigned context
610

Control selective transmission of the data carrying the assigned context based on the capability of the network primitive to receive the data carrying the assigned context
620

(56) References Cited

U.S. PATENT DOCUMENTS

| | | | |
|---|---|---|---|
| 2016/0380864 A1* | 12/2016 | Shen | H04L 63/0227 370/241 |
| 2017/0026417 A1 | 1/2017 | Ermagan et al. | |
| 2018/0013584 A1 | 1/2018 | Shen et al. | |
| 2018/0077080 A1* | 3/2018 | Gazier | H04L 43/0817 |
| 2018/0351862 A1* | 12/2018 | Jeganathan | H04L 45/745 |
| 2020/0053562 A1* | 2/2020 | Kim | H04W 8/02 |
| 2020/0177503 A1 | 6/2020 | Hooda et al. | |
| 2020/0213151 A1 | 7/2020 | Srivatsan et al. | |
| 2020/0275360 A1* | 8/2020 | Bordeleau | H04W 76/11 |

OTHER PUBLICATIONS

International Search Report and Written Opinion from the International Searching Authority, dated Nov. 18, 2021, 17 pages, for corresponding International Patent Application No. PCT/US2021/044007.

* cited by examiner

NETWORK SERVICE ACCESS AND DATA ROUTING BASED ON ASSIGNED CONTEXT

CROSS-REFERENCE TO RELATED APPLICATIONS

This application claims priority to U.S. Provisional Patent Application No. 63/065,932, filed on Aug. 14, 2020, the content of which is incorporated herein by reference in its entirety.

TECHNICAL FIELD

The subject matter of this disclosure relates in general to the field of computer networking, and more particularly, to systems, methods, and computer-readable media for controlling network service access and data routing based on either or both user and application context.

BACKGROUND

The enterprise network landscape is continuously evolving. There is a greater demand for mobile and Internet of Things (IoT) device traffic, Software as a Service (SaaS) applications, and cloud adoption. In addition, security needs are increasing and certain applications can require prioritization and optimization for proper operation. As this complexity grows, there is a push to reduce costs and operating expenses while providing for high availability and scale.

Conventional wide area network (WAN) architectures are facing major challenges under this evolving landscape. Conventional WAN architectures typically consist of multiple Multi-Protocol Label Switching (MPLS) transports, or MPLS paired with Internet or Long-Term Evolution (LTE) links used in an active/backup fashion, most often with Internet or SaaS traffic being backhauled to a central data center or regional hub for Internet access. Issues with these architectures can include insufficient bandwidth, high bandwidth costs, application downtime, poor SaaS performance, complex operations, complex workflows for cloud connectivity, long deployment times and policy changes, limited application visibility, and difficulty in securing the network.

In recent years, software-defined enterprise network solutions have been developed to address these challenges. Software-defined enterprise networking is part of a broader technology of software-defined networking (SDN) that includes both software-defined wide area networks (SD-WAN) and software-defined local area networks (SDLAN). SDN is a centralized approach to network management which can abstract away the underlying network infrastructure from its applications. This de-coupling of data plane forwarding and control plane can allow a network operator to centralize the intelligence of the network and provide for more network automation, operations simplification, and centralized provisioning, monitoring, and troubleshooting. Software-defined enterprise networking can apply these principles of SDN to the WAN and a local area network (LAN).

Devices within a SDWAN and networks involved in SDWAN integrations, e.g. cross-domain SDWAN integrations, can lack the capability to facilitate data routing and network service access based on assigned user and application contexts. In particular, some SDWAN-capable devices in a deployment might support the capability to accept assigned contexts in providing network service access, while other devices lack the capability to accept assigned contexts in providing network service access. Thus, it is currently difficult to support brownfield or greenfield SDWAN deployment when edge devices without this capability are used in the deployment.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
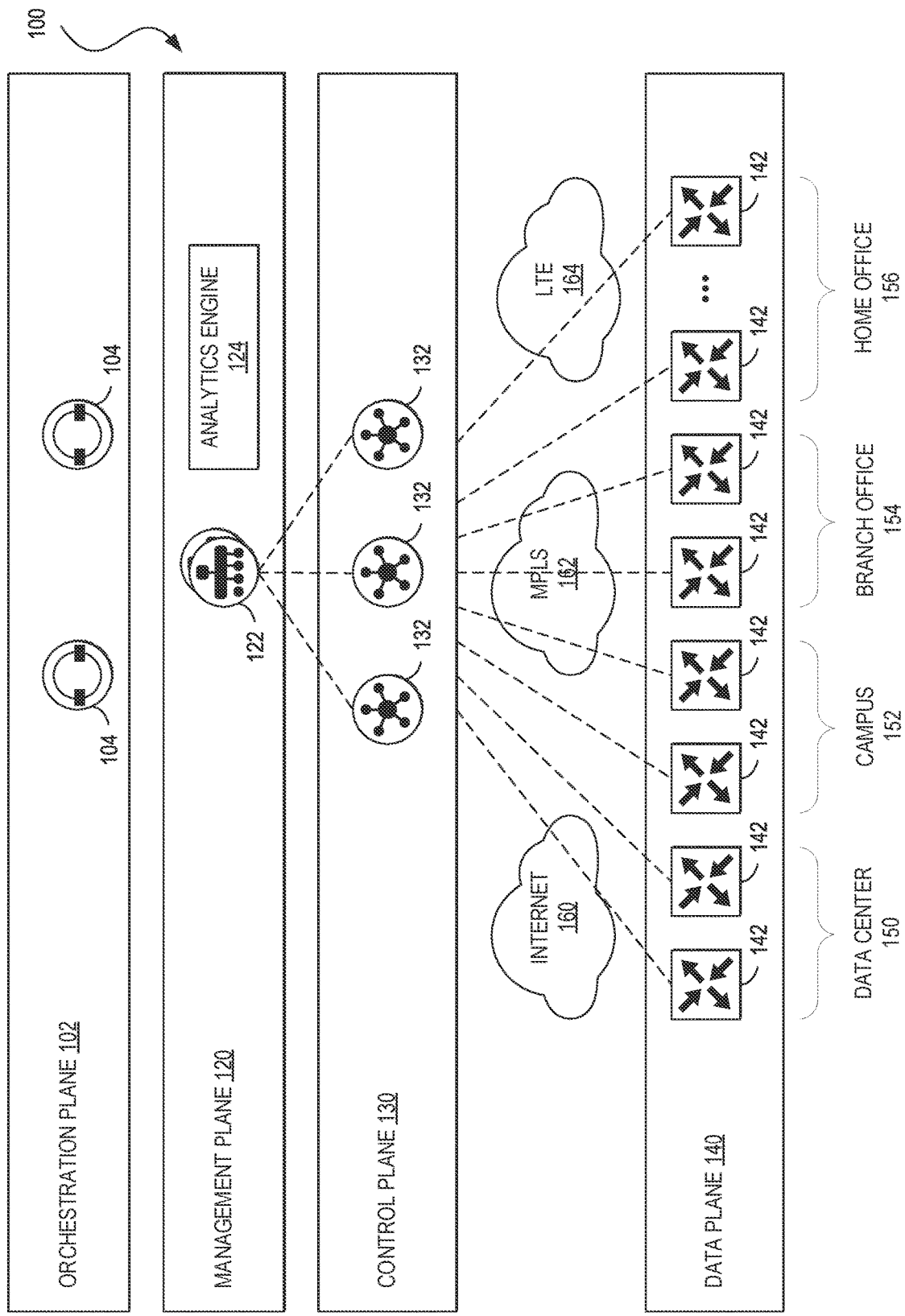
FIG. 1 illustrates an example of a high-level network architecture in accordance with an embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include defining, for a network primitive in a network domain, whether the network primitive can receive data carrying an assigned context associated from one or more source nodes through a software-defined wide area network (SDWAN) fabric overlay; advertising a capability of the network primitive, the capability stating whether the network primitive can receive the data carrying the assigned context; and controlling selective transmission of the data carrying the assigned context from the one or more source nodes to the network primitive through the SDWAN fabric overlay based on the capability of the network primitive to receive the data carrying the assigned context.

In some embodiments of the method, the network primitive is one of a network tunnel, a virtual private network, and nodes in a specific prefix in the network domain.

In some embodiments of the method, the assigned context is a security group tag assigned to the one or more source nodes.

In some embodiments of the method, the one or more source nodes are in a second network domain which is coupled to the network domain containing the network primitive through the SDWAN fabric overlay.

In some embodiments of the method, the network primitive includes one or more of a virtual private network associated with a network device, a network tunnel associated with the network device, and a network prefix associated with the network device, and the method further includes controlling selective transmission of the data carrying the assigned context in a priority order of whether the network tunnel has the capability to receive the data carrying the assigned context, whether the virtual private network has the capability to receive the data carrying the assigned context, and whether the network prefix has the capability to receive the data carrying the assigned context.

In some embodiments of the method, the network primitive is nodes in a specific prefix in the network domain, and the method further includes maintaining a prefix list based on whether nodes in a plurality of different prefixes can receive the data carrying the assigned context, the prefix list including a list of prefixes which can receive the data carrying the assigned context; applying a route map to the prefix list, the route map including the network primitive and the one or more source nodes; and determining whether the data carrying the assigned context can be received by the network primitive based on application of the route map to the prefix list.

In some embodiments of the method, the network primitive shares the data carrying the assigned context with other network primitives in the network domain.

In some embodiments of the method, the network primitive is an edge node that is in a specific prefix in the network domain and is configured to receive data through a specific tunnel in a specific virtual private network, and the method further includes determining whether the specific tunnel has the capability to receive the data carrying the assigned context; determining whether the specific virtual private network has the capability to receive the data carrying the assigned context; determining whether the specific prefix has the capability to receive the data carrying the assigned context; and controlling selective transmission of the data carrying the assigned context to the edge node based on whether the specific tunnel, the specific virtual private network, and the specific prefix have the capability to receive the data carrying the assigned context.

In some embodiments of the method, controlling selective transmission of the data carrying the assigned context to the edge node further includes refraining from transmitting the data carrying the assigned context to the edge node if the specific tunnel lacks the capability to receive the data carrying the assigned context regardless of whether the specific virtual private network and the specific prefix have the capability to receive the data carrying the assigned context.

In some embodiments of the method, controlling selective transmission of the data carrying the assigned context to the edge node further includes refraining from transmitting the data carrying the assigned context to the edge node if the specific virtual private network lacks the capability to receive the data carrying the assigned context regardless of whether the specific prefix has the capability to receive the data carrying the assigned context.

In some embodiments of the method, the method further includes controlling propagation of the data carrying the assigned context to additional nodes within the specific prefix based on characteristics of the specific prefix in receiving the data carrying the assigned context.

In some embodiments of the method, the characteristics of the specific prefix in receiving the data carrying the assigned context include that the edge node is a suitable destination receiving the data carrying the assigned context.

In some embodiments of the method, the SDWAN fabric overlay is managed by an overlay management protocol (OMP).

In some embodiments of the method, the OMP is configured to control selective transmission of the data carrying the assigned context from the one or more source nodes to the network primitive through the SDWAN fabric overlay based on the capability of the network primitive to receive the data carrying the assigned context.

In some embodiments of the method, the OMP is configured to control selective transmission of the data carrying the assigned context by updating one or more forwarding tables of the one or more source nodes based on the capability of the network primitive to receive the data carrying the assigned context.

A system can include one or more processors and at least one computer-readable storage medium having stored therein instructions which, when executed by the one or more processors, cause the one or more processors to perform operations comprising defining, for a network primitive in a network domain, whether the network primitive can receive data carrying an assigned context associated from one or more source nodes through a software-defined wide area network (SDWAN) fabric overlay; advertising a capability of the network primitive, the capability stating whether the network primitive can receive the data carrying the assigned context; and controlling selective transmission of the data carrying the assigned context from the one or more source nodes to the network primitive through the SDWAN fabric overlay based on the capability of the network primitive to receive the data carrying the assigned context.

A non-transitory computer-readable storage medium can include instructions stored therein which, when executed by a processor, cause the processor to perform operations comprising defining, for a network primitive in a network domain, whether the network primitive can receive data carrying an assigned context associated from one or more source nodes through a software-defined wide area network (SDWAN) fabric overlay; advertising a capability of the network primitive, the capability stating whether the network primitive can receive the data carrying the assigned context; and controlling selective transmission of the data carrying the assigned context from the one or more source nodes to the network primitive through the SDWAN fabric overlay based on the capability of the network primitive to receive the data carrying the assigned context.

EXAMPLE EMBODIMENTS

The disclosed technology addresses the need in the art for determining edge device capabilities to receive user and application context in SDWANs. The present technology involves methods, systems, and non-transitory computer-readable media for controlling network service access and data routing based on either or both user and application context in SDWANs. The present technology can specifically decrease the difficulty of brownfield or greenfield deployments.

FIG. 1 illustrates an example of a network architecture 100 for implementing aspects of the present technology. An example of an implementation of the network architecture 100 is the Cisco® SDWAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122. The management plane 120 can include an analytics engine 124 to provide analytics for the network.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
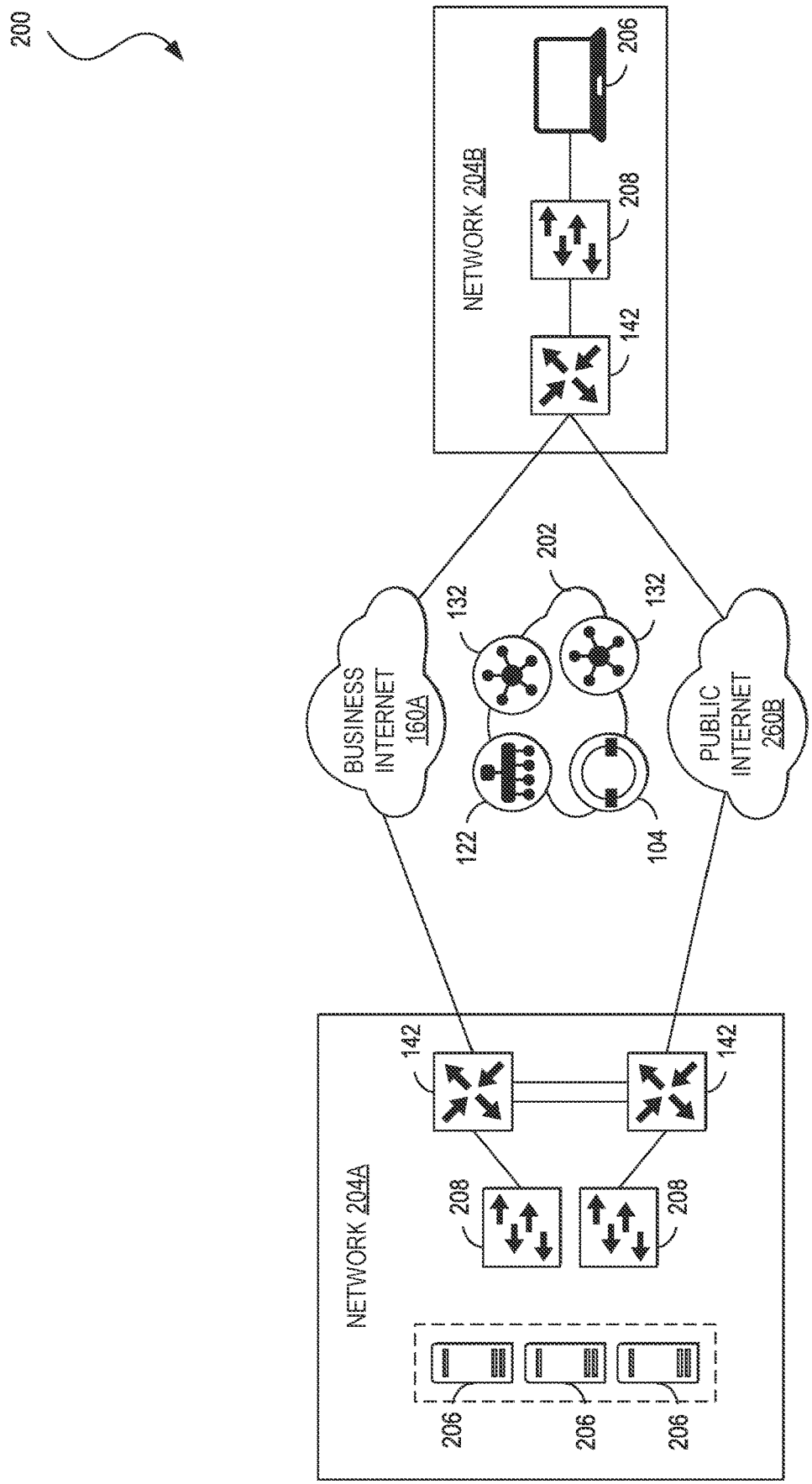
FIG. 2 illustrates an example of a network topology in accordance with an embodiment.

FIG. 2 illustrates an example of a network topology 200 for showing various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2,custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
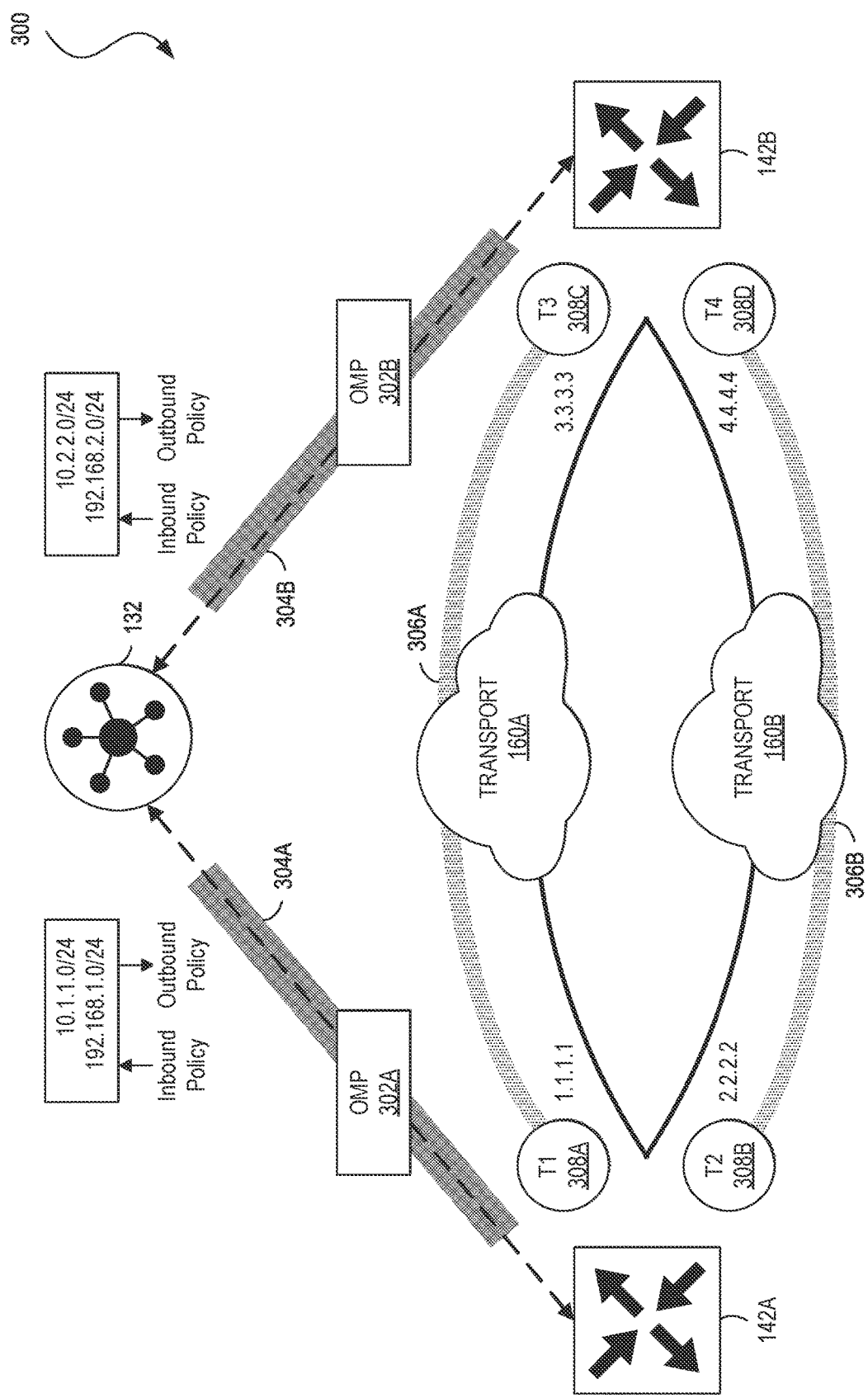
FIG. 3 illustrates an example of a diagram showing the operation of a protocol for managing an overlay network in accordance with an embodiment.

FIG. 3 illustrates an example of a diagram 300 showing the operation of OMP, which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise three types of routes:

- OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.
- TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.
- Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
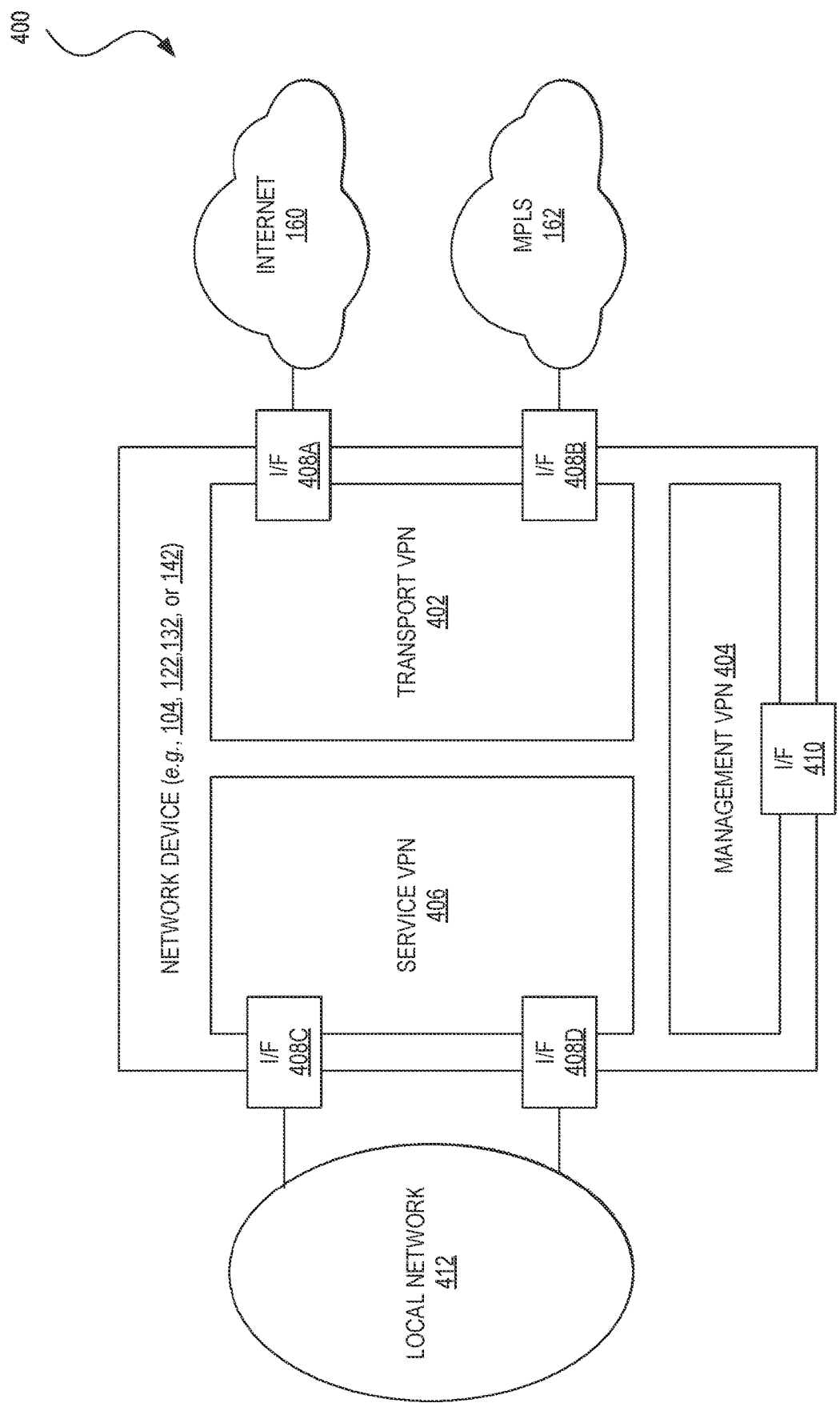
FIG. 4 illustrates an example of a diagram showing the operation of virtual private networks for segmenting a network in accordance with an embodiment.

FIG. 4 illustrates an example of a diagram 400 showing the operation of VPNs, which may be used in some embodiments to provide segmentation for a network (e.g., the network architecture 100). VPNs can be isolated from one another and can have their own forwarding tables. An interface or sub-interface can be explicitly configured under a single VPN and may not be part of more than one VPN.

Labels may be used in OMP route attributes and in the packet encapsulation, which can identify the VPN to which a packet belongs. The VPN number can be a four-byte integer with a value from 0 to 65530. In some embodiments, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 410A and 410B) that respectively connect to WAN transport networks (e.g., the MPLS network 162 and the Internet transport network 160). Secure DTLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 410C. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 410D and 410E) that connect to one or more local-site networks 412 and carry user data traffic. The service-side VPN(s) 406 can be enabled for features such as OSPF or BGP, Virtual Router Redundancy Protocol (VRRP), QoS, traffic shaping, policing, and so forth. In some embodiments, user traffic can be directed over IPSec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 410A-E (collectively, 410) are shown to be physical interfaces in this example, one of ordinary skill in the art will appreciate that the interfaces 410 in the transport and service VPNs can also be sub-interfaces instead.

The system described above in FIGS. 1-4 is configured to allow networks and devices to accept or not accept an assigned context, depending on their capabilities. Conversely, these networks and devices can advertise their capabilities and tell senders whether the assigned context would be accepted. The present technology allows network primitives (such as tunnels, VPNs, and prefixes) to define a capability to accept an assigned context (such as a security group tag). The network primitives can advertise this capability, e.g. over a dynamic routing extension, such as extension compatible with an overlay management protocol (OMP). As follows, a sender can decide whether to send data with an assigned context associated with the sender, e.g. a security group tag (SGT), to the remote end or not. Additionally, it also allows the flexibility of sending the assigned context from a source-edge to a destination-edge while controlling propagation of the assigned context further into the subsequent fabric domain, e.g. by limiting propagation of the assigned context further into the fabric domain.

For tunnel and VPN primitives, the capability of being able to receive an assigned context can be defined at the endpoint (TLOC) level and VPN level respectively. For prefixes, the capability can be defined using prefix-map and route-map applied to a dynamic routing extension, e.g. OMP. The following are example triggers for network tunnels, VPNs, and prefixes, respectively which advertise the capability to receive and process SGTs:

Tunnel/TLOC based:
sdwan
  interface GigabitEthernet0/0/0
    tunnel-interface
      sgt-allow
VPN based:
sdwan
  vrf 1
    address-family ipv4
      service sgt
Prefix based:
ip prefix-list plist1 seq 10 permit 192.1.0.0/16 eq 16
  route-map rmap1 permit 10
    match ip address prefix-list plist1

Device capabilities, which can be hardcoded, are translated into the tunnel protocol. In some embodiments, SGT capabilities can be processed by centralized controllers, such as CISCO vSmart, which can propagate that information throughout a domain fabric to source nodes.

A dynamic routing extension can be used to advertise the network primitive's capability per TLOC or per VPN or per overlay prefix. This advertised capability can be programmed into the forwarding plane in the following targets for each type of network primitive: tunnel next-hop, VPN, and prefix lookup result.

In some embodiments, enforcement of the network primitive's capability can proceed in the order of tunnel, then VPN, then prefix. For example, if a tunnel supports context based data routing and network service access and the prefix does not, then the assigned context can be sent to the destination edge but not propagated beyond the destination edge. If a given network primitive does not support any cross-domain integration then the dynamic routing extension can refrain from bringing these advertisements to the source. This refraining can be brought upon by lack of capability in the tunnel, VPN, or prefix, or a combination.

In some embodiments, a list of prefixes can be maintained which lists those prefixes with the capability to receive the assigned context. Route maps can be applied to a given prefix in the list of prefixes, and using the route map and the list of prefixes, the present technology can determine whether the given prefix has the capability to receive the assigned context.

In some embodiments, the network primitive can further control propagation of data and an assigned context. This propagation can be limited to other nodes in a specific prefix, nodes in the network of the network primitive, or by other factors. In some embodiments, the network primitive can be in a separate network from the source nodes which send the data carrying the assigned context. When the network primitive is a specific prefix, propagation can be limited to other nodes within the specific prefix, or propagation can be limited based on characteristics of the specific prefix.

To illustrate a detailed example, enforcement of a VPN's capability can take the following form:
EDGE-1
sdwan
  vrf 1
    address-family ipv4
      service sgt
  vrf 10
    address-family ipv4
      service sgt
EDGE-2
sdwan
  vrf 1
    address-family ipv4
      service sgt
EDGE-3
sdwan
  vrf 10
    address-family ipv4
      service sgt Once the capabilities of edges are defined, dynamic routing extension-based context capability associated with VPN labels can be advertised:

EDGE-1 advertises to centralized controller (vSmart):
  {vrf:1, attr:SGT, service-label:1}
  {vrf:10, attr: SGT, service-label:110}
EDGE-2 advertises to centralized controller (vSmart):
  {vrf:1, attr:SGT, service-label:21}
EDGE-3 advertises to centralized controller (vSmart):
  {vrf:10, attr:SGT, service-label: 310}

In vSmart, dynamic routing extensions will advertise VPN context capability to devices rather than associate it with prefixes. This method provides a way to scalably implement the context capability at the devices and, at the same time, allows the independently-configured prefix-based capability to be enforced as well (note that prefix-result, indirect-nexthop, & tunnel-nexthop in the dataplane path have independent context-allow attributes).

vSmart can advertise as such:
vSmart advertises to EDGE-1:
  {EDGE-2/vrf:1/service-label:21/attr:sgt}
  {EDGE-3/vrf:10/service-label:310/attr:sgt}
vSmart advertises to EDGE-2:
  {EDGE-1/vrf:1/service-label:11/attr:sgt}
vSmart advertises to EDGE-3:
  {EDGE-1/vrf:10/service-label:110/attr:sgt}

Figure 5:
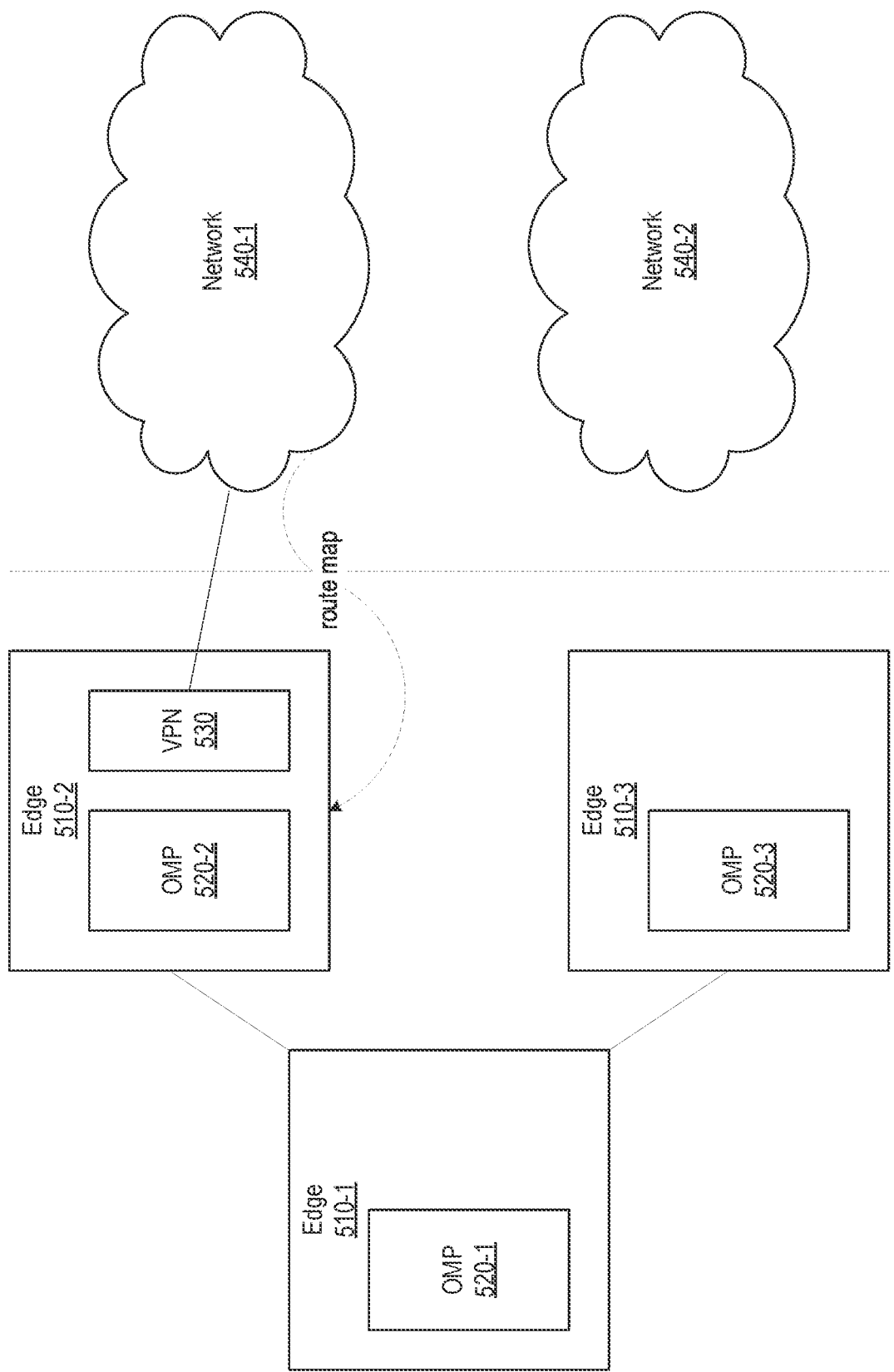
FIG. 5 illustrates an example of a network environment in accordance with an embodiment.

CISCO Packet Processing (CPP) in the data plane can control virtual routing and forwarding (vrf):

vrf:1 EDGE-1 to EDGE-2:
  prefix-lookup->prefix-result/attr:sgt->indirect-nexthop/service-label:21/attr:sgt->tunnel-nexthop/attr:sgt
vrf:10 EDGE-1 to EDGE-3:
  prefix-lookup->prefix-result/attr:sgt->indirect-nexthop/service-label:310/attr:sgt->tunnel-nexthop/attr:sgt
vrf:1 EDGE-2 to EDGE-1:
  prefix-lookup->prefix-result/attr:sgt->indirect-nexthop/service-label:11/attr:sgt->tunnel-nexthop/attr:sgt
vrf:10 EDGE-3 to EDGE-1:
  prefix-lookup->prefix-result/attr:sgt->indirect-nexthop/service-label:21/attr:sgt->tunnel-nexthop/attr:sgt FIG. 5 illustrates an example diagram of a network environment in accordance with an environment. An edge can advertise capability to accept an assigned context, and use that advertisement to affect communication with other devices and networks.

Edges 510-1, 510-2, and 510-3 can advertise capabilities to receive SGTs using OMP interfaces 520-1, 520-2, and 520-3, respectively. When capabilities are advertised, OMP interfaces 520 can propagate capability advertisements through the domain via CISCO vSmart or another centralized controller. This allows all edges 510 to know which tunnels, VPNs, and prefixes have the capability to receive SGTs. Edges 510 can use CPP or another packet processor to control virtual routing and forwarding. In some embodiments, edge 510 as a device will have a certain SGT capability, which will be translated and treated under the tunneling protocol.

In some embodiments, edge 510-2 may not have the capability to receive SGTs. Edge 510-2 can advertise its capability via OPM transmitter 520-2 to edge 510-1. Edge 510-2 can control selective transmission from edge 510-1 to edge 510-2 based on its advertised capability and whether the transmissions from edge 510-1 contain SGTs.

Edge 510-2 can enforce capabilities for tunnel next hops, VPNs, and prefixes, in that order. For example, if a tunnel does not support the capability but a prefix does, then SGTs will not be send to edge 510-2. If the tunnel does support SGTs and the prefix allows SGTs as a destination, then SGTs can be received but will not be propagated by edge 510-2.

Prefix capability can be defined in part using a route map received from network 540-1 applied to OMP transmitter 520-2. A route map is a list of routes accompanied with permission or denial of communication along those routes. Evaluation of a route against a route map consists of a scan through the list of routes, in a predetermined order, and an evaluation of the criteria of each matching statement. A list scan is aborted once the first statement match is found and an action associated with the statement match is performed. The route map received from network 540-1 by edge 510-2 can list what interfaces are available for communication in network 540-1.

VPN 530 on edge 510-2 can separately advertise to network 540-1 its capability to receive SGTs, and vice versa. Networks 540-1 and 540-2 can be non-fabric networks communicating with edges 510 which all exist in a given fabric.

Figure 6:
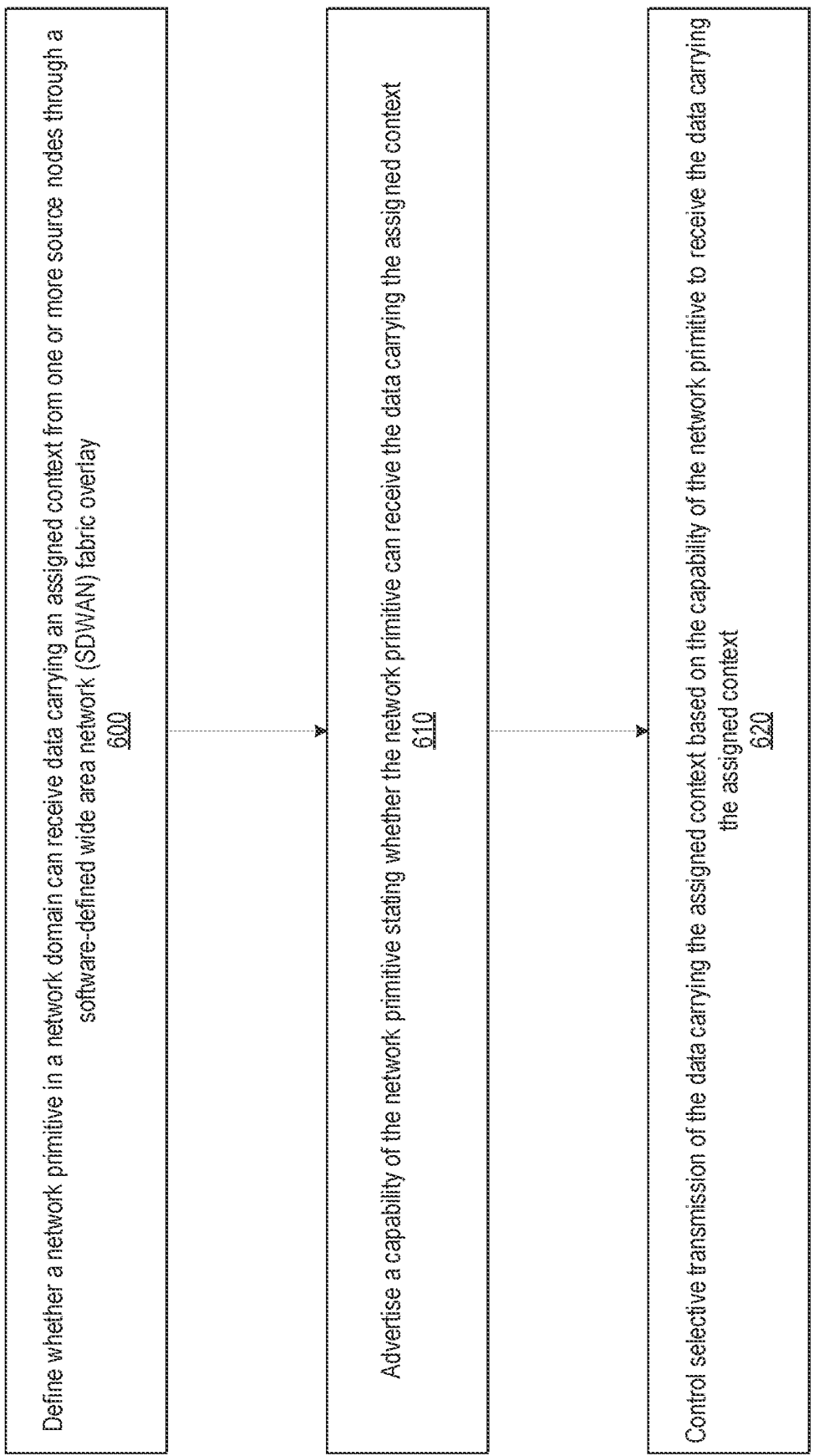
FIG. 6 illustrates an example method in accordance with an embodiment.

FIG. 6 illustrates an example method in accordance with an embodiment. A network primitive can define whether or not it accepts an assigned context, advertise that definition, and subsequently receive the appropriate data.

The method begins by defining (600) whether a network primitive in a network domain can receive data carrying an assigned context from one or more source nodes through a SDWAN fabric overlay. In some embodiments, the network primitive can be a network tunnel, a virtual private network, or a prefix in the network domain, such as those described in FIGS. 1-4. In some embodiments, the source nodes can be in a different network domain from the network primitive, where the domains are coupled through the SDWAN fabric overlay. In some embodiments, the assigned context can be an SGT assigned to the one or more source nodes.

In some embodiments, the network primitive can be an edge node in a specific prefix in the network domain configured to receive data through a specific tunnel in a specific VPN. In such cases, the method determines whether the specific tunnel, the specific VPN, and the specific prefix can receive the data carrying the assigned context. In some embodiments, the priority order can proceed from tunnel to VPN to prefix. In some embodiments, whether or not the network primitive can receive the data carrying the defined context can be determined based on a combination of the capabilities of a tunnel, VPN, and prefix.

In some embodiments, when the network primitive is a prefix, determining that the prefix has the capability to receive the data with the assigned context can involve the use of a prefix list which lists which prefixes have the capability. A route map can be applied to the prefix list, and the capability of the prefix can be determined.

The capability of the network primitive is advertised (610) to the one or more source nodes through the SDWAN fabric overlay. The advertised capability directly relates to the network primitive's capability to receive data carrying the assigned context.

The network primitive controls (620) selective transmission of the data carrying the assigned context from the one or more source nodes based on the capability of the network primitive. In some embodiments, this occurs by source nodes refraining from sending the assigned context to the network primitives which do not have that capability. In some embodiments, this occurs by source nodes transmitting the assigned context to the network primitives which do have that capability. In some embodiments, the network primitive may not receive any portion of the data when the data contains information that the primitive is incapable of receiving, e.g. based on presence of the assigned context in the data.

In some embodiments, selective a network primitive can include one or more of a network tunnel, a VPN, and a network prefix, as in edges 510 in FIG. 5. Selective transmission of the assigned context can depend on any combination of the capabilities of the network tunnels, VPNS and network prefixes, which can be determined separately. In some embodiments, selective transmission of the data carrying the assigned context can be determined in a priority order for the capability of a network tunnel, a VPN, and a prefix. In some embodiments, controlling selective transmission of the data carrying the assigned context to an edge 510 can include refraining from transmitting the data carrying the assigned context to edge 510. This refraining can be due to a tunnel lacking the capability to receive the data carrying the assigned context, and can be carried out regardless of whether a VPN and prefix have the capability to receive the data carrying the assigned context. In other situations, this refraining can be due to a VPN lacking the capability to receive the data carrying the assigned context, and can be carried out regardless of whether the prefix has the capability to receive the data carrying the assigned context.

In some embodiments, selective transmission can be device based, wherein the selective transmission is controlled using the network tunnel protocol.

In some embodiments, when the network primitive is a prefix, controlling selective transmission can include sharing data carrying the assigned context with other network primitives in the network domain. In some embodiments, when the network primitive is a prefix, controlling selective transmission can include sharing data carrying the assigned context with other nodes in a prefix based on characteristics of the prefix. Characteristics of the prefix can include that an edge node is a suitable destination for receiving the data carrying the assigned context, other devices in the prefix, location, or other factors.

In some embodiments, controlling transmission can involve refraining from transmitting the data carrying the assigned context to the network primitive. In some embodiments, controlling transmission can involve receiving, by the network primitive, the data carrying the assigned context. In some embodiments, controlling transmission can involve propagating the data carrying the assigned context. The network primitive can propagate the data carrying the assigned context to other network primitives in the same network or in other networks it is connected to through the SDWAN overlay fabric, which can be managed by an OMP. In some embodiments, the OMP itself can control transmission through updating forwarding tables of network primitives or via other means.

Figure 7:
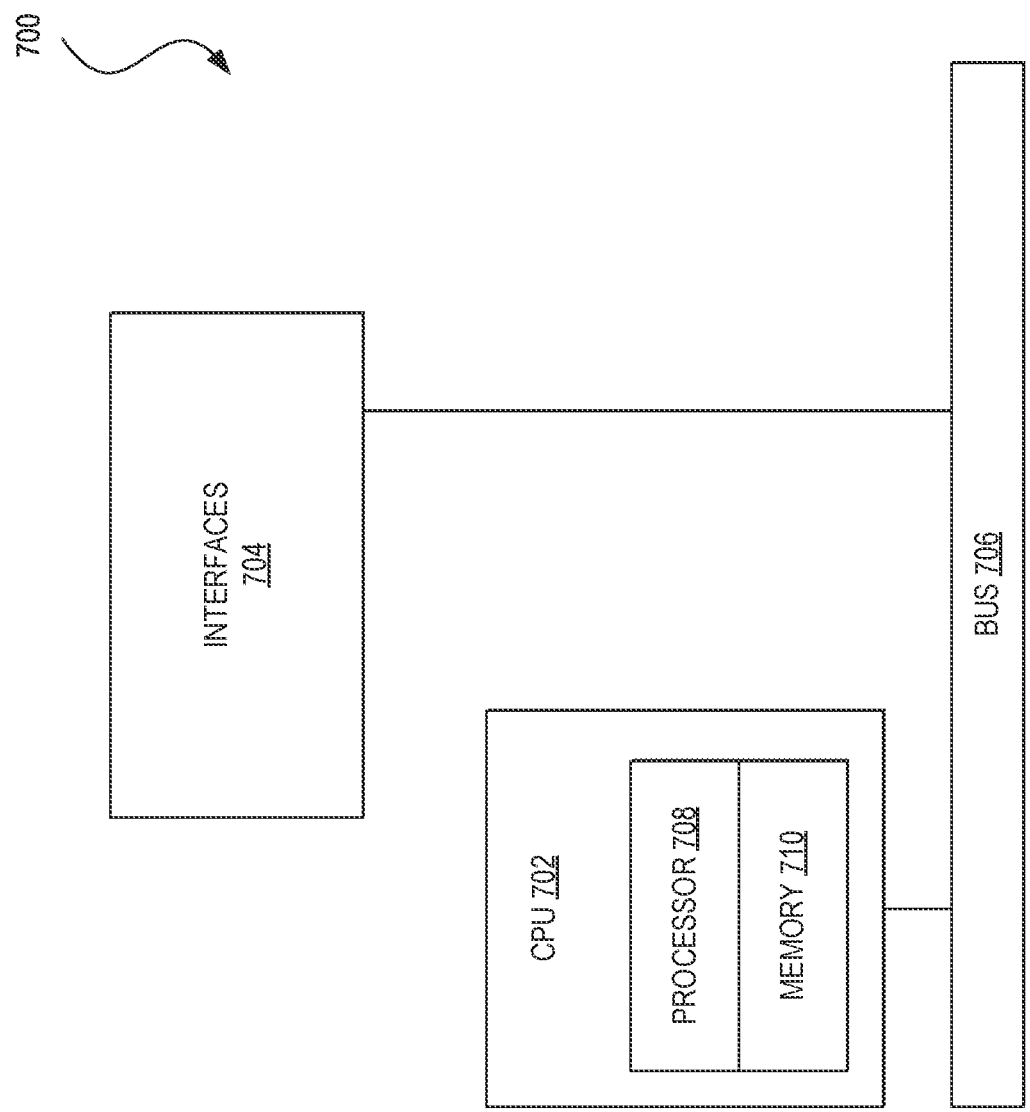
FIG. 7 illustrates an example of a network device.

FIG. 7 illustrates an example of a network device 700 (e.g., switch, router, network appliance, etc.). The network device 700 can include a master central processing unit (CPU) 702, interfaces 704, and a bus 706 (e.g., a PCI bus). When acting under the control of appropriate software or firmware, the CPU 702 can be responsible for executing packet management, error detection, and/or routing functions. The CPU 702 preferably accomplishes all these functions under the control of software including an operating system and any appropriate applications software. The CPU 702 may include one or more processors 708 such as a processor from the Motorola family of microprocessors or the MIPS family of microprocessors. In an alternative embodiment, the processor 708 can be specially designed hardware for controlling the operations of the network device 700. In an embodiment, a memory 710 (such as non-volatile RAM and/or ROM) can also form part of the CPU 702. However, there are many different ways in which memory could be coupled to the system.

The interfaces 704 can be provided as interface cards (sometimes referred to as line cards). The interfaces 704 can control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 704 may include ports appropriate for communication with the appropriate media. In some cases, the interfaces 704 may also include an independent processor and, in some instances, volatile RAM. The independent processors may control communication intensive tasks such as packet switching, media control, and management. By providing separate processors for the communication intensive tasks, the interfaces 704 may allow the CPU 702 to efficiently perform routing computations, network diagnostics, security functions, and so forth.

Although the system shown in FIG. 7 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 700.

Regardless of the network device's configuration, it may employ one or more memories or memory modules (including the memory 710) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 8:
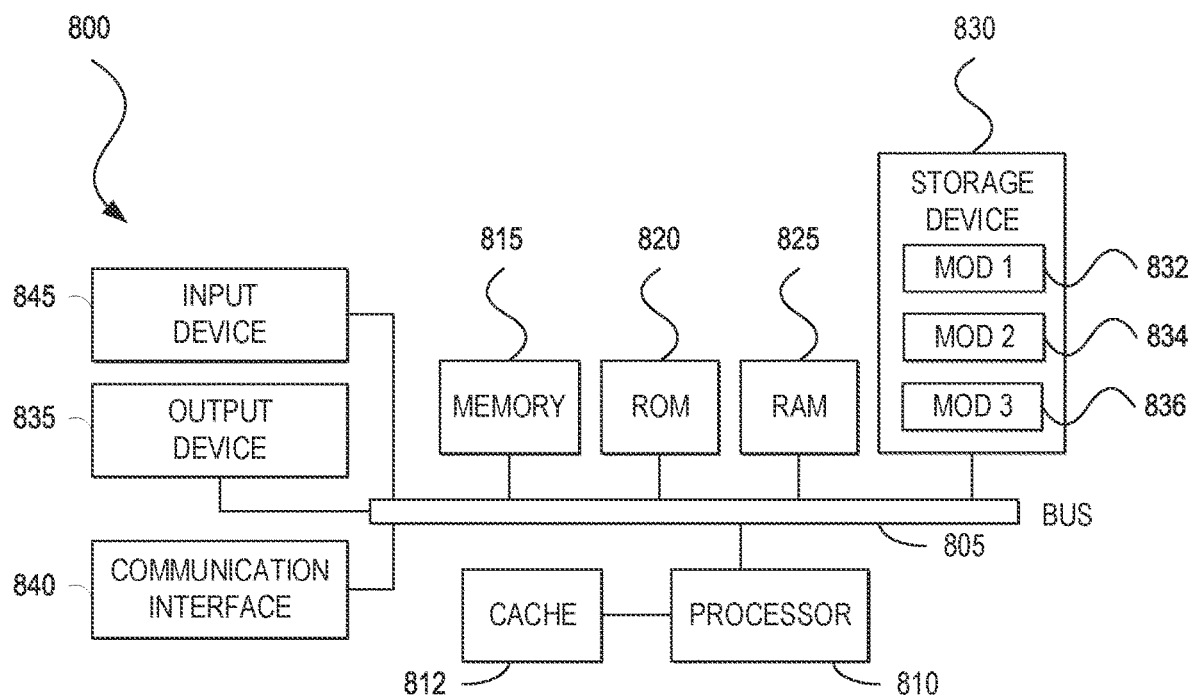
FIG. 8 illustrates an example of a bus computing system wherein the components of the system are in electrical communication with each other using a bus.

FIG. 8 illustrates an example of a bus computing system 800 wherein the components of the system are in electrical communication with each other using a bus 805. The computing system 800 can include a processing unit (CPU or processor) 810 and a system bus 805 that may couple various system components including the system memory 815, such as read only memory (ROM) 820 and random access memory (RAM) 825, to the processor 810. The computing system 800 can include a cache 812 of high-speed memory connected directly with, in close proximity to, or integrated as part of the processor 810. The computing system 800 can copy data from the memory 815, ROM 820, RAM 825, and/or storage device 830 to the cache 812 for quick access by the processor 810. In this way, the cache 812 can provide a performance boost that avoids processor delays while waiting for data. These and other modules can control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in the storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-protected screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can govern and manage the user input and system output. There may be no restriction on operating on any particular hardware arrangement and therefore the basic features here may easily be substituted for improved hardware or firmware arrangements as they are developed.

The storage device 830 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 830 can include the software modules 832, 834, 836 for controlling the processor 810. Other hardware or software modules are contemplated. The storage device 830 can be connected to the system bus 805. In some embodiments, a hardware module that performs a particular function can include a software component stored in a computer-readable medium in connection with the necessary hardware components, such as the processor 810, bus 805, output device 835, and so forth, to carry out the function.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
defining, by each of one or more network primitives in a network domain, whether the network primitive can receive data carrying an assigned context from one or more source nodes through a software-defined wide area network (SDWAN) fabric overlay;
advertising, by each network primitive to the one or more source nodes, a capability of each of the network primitives, the capability stating whether the network primitive can receive the data carrying the assigned context;
determining, by the SDWAN fabric overlay, from a configured list of options a type of network primitive of the network primitive, the configured list of options including a network tunnel, a virtual private network, and nodes in a specific prefix in the network domain; and
controlling, by the SDWAN fabric overlay, selective transmission of the data carrying the assigned context from the one or more source nodes to the one or more network primitives through the SDWAN fabric overlay based on the capability of the network primitive to receive the data carrying the assigned context and the type of network primitive of the network primitive.

2. The method of claim 1, wherein the assigned context is a security group tag assigned to the one or more source nodes.

3. The method of claim 1, wherein the one or more source nodes are in a second network domain which is coupled to the network domain containing the network primitive through the SDWAN fabric overlay.

4. The method of claim 1, wherein the network primitive includes one or more of a virtual private network associated with a network device, a network tunnel associated with the network device, and a network prefix associated with the network device, the method further comprising:
controlling selective transmission of the data carrying the assigned context in a priority order of whether the network tunnel has the capability to receive the data carrying the assigned context, whether the virtual private network has the capability to receive the data carrying the assigned context, and whether the network prefix has the capability to receive the data carrying the assigned context.

5. The method of claim 1, wherein the network primitive is nodes in a specific prefix in the network domain, the method further comprising:
maintaining a prefix list based on whether nodes in a plurality of different prefixes can receive the data carrying the assigned context, the prefix list including a list of prefixes which can receive the data carrying the assigned context;
applying a route map to the prefix list, the route map including the network primitive and the one or more source nodes; and
determining whether the data carrying the assigned context can be received by the network primitive based on application of the route map to the prefix list.

6. The method of claim 1, wherein the network primitive shares the data carrying the assigned context with other network primitives in the network domain.

7. The method of claim 1, wherein the network primitive is an edge node that is in a specific prefix in the network domain and is configured to receive data through a specific tunnel in a specific virtual private network, the method further comprising:
determining whether the specific tunnel has the capability to receive the data carrying the assigned context;
determining whether the specific virtual private network has the capability to receive the data carrying the assigned context;
determining whether the specific prefix has the capability to receive the data carrying the assigned context; and controlling selective transmission of the data carrying the assigned context to the edge node based on whether the specific tunnel, the specific virtual private network, and the specific prefix have the capability to receive the data carrying the assigned context.

8. The method of claim 7, wherein controlling selective transmission of the data carrying the assigned context to the edge node further includes refraining from transmitting the data carrying the assigned context to the edge node if the specific tunnel lacks the capability to receive the data carrying the assigned context regardless of whether the specific virtual private network and the specific prefix have the capability to receive the data carrying the assigned context.

9. The method of claim 7, wherein controlling selective transmission of the data carrying the assigned context to the edge node further includes refraining from transmitting the data carrying the assigned context to the edge node if the specific virtual private network lacks the capability to receive the data carrying the assigned context regardless of whether the specific prefix has the capability to receive the data carrying the assigned context.

10. The method of claim 7, further comprising controlling propagation of the data carrying the assigned context to additional nodes within the specific prefix based on characteristics of the specific prefix in receiving the data carrying the assigned context.

11. The method of claim 10, wherein the characteristics of the specific prefix in receiving the data carrying the assigned context include that the edge node is a suitable destination receiving the data carrying the assigned context.

12. The method of claim 1, wherein the SDWAN fabric overlay is managed by an overlay management protocol (OMP).

13. The method of claim 12, wherein the OMP is configured to control selective transmission of the data carrying the assigned context from the one or more source nodes to the network primitive through the SDWAN fabric overlay based on the capability of the network primitive to receive the data carrying the assigned context.

14. The method of claim 13, wherein the OMP is configured to control selective transmission of the data carrying the assigned context by updating one or more forwarding tables of the one or more source nodes based on the capability of the network primitive to receive the data carrying the assigned context.

15. A system comprising:
one or more processors; and
at least one computer-readable storage medium having stored therein instructions which, when executed by the one or more processors, cause the one or more processors to perform operations comprising:
defining, by each of one or more network primitives in a network domain, whether the network primitive can receive data carrying an assigned context from one or more source nodes through a software-defined wide area network (SDWAN) fabric overlay;
advertising, by each network primitive to the one or more source nodes, a capability of each of the network primitives, the capability stating whether the network primitive can receive the data carrying the assigned context;
determining, by the SDWAN fabric overlay, from a configured list of options a type of network primitive of the network primitive, the configured list of options including a network tunnel, a virtual private network, and nodes in a specific prefix in the network domain; and
controlling, by the SDWAN fabric overlay, selective transmission of the data carrying the assigned context from the one or more source nodes to the one or more network primitives through the SDWAN fabric overlay based on the capability of the network primitive to receive the data carrying the assigned context and the type of network primitive of the network primitive.

16. The system of claim 15, wherein the SDWAN fabric overlay is managed by an overlay management protocol (OMP).

17. The system of claim 15, wherein the assigned context is a security group tag assigned to the one or more source nodes.

18. The system of claim 15, wherein the one or more source nodes are in a second network domain which is coupled to the network domain containing the network primitive through the SDWAN fabric overlay.

19. A non-transitory computer-readable storage medium having stored therein instructions which, when executed by a processor, cause the processor to perform operations comprising:
defining, by each of one or more network primitives in a network domain, whether the network primitive can receive data carrying an assigned context from one or more source nodes through a software-defined wide area network (SDWAN) fabric overlay;
advertising, by each network primitive to the one or more source nodes, a capability of the network primitive, the capability stating whether the network primitive can receive the data carrying the assigned context;
determining, by the SDWAN fabric overlay, from a configured list of options a type of network primitive of the network primitive, the configured list of options including a network tunnel, a virtual private network, and nodes in a specific prefix in the network domain; and
controlling, by the SDWAN fabric overlay, selective transmission of the data carrying the assigned context from the one or more source nodes to the one or more network primitives through the SDWAN fabric overlay based on the capability of the network primitive to receive the data carrying the assigned context and the type of network primitive of the network primitive.

20. The non-transitory computer-readable storage medium of claim 19, wherein the SDWAN fabric overlay is managed by an overlay management protocol (OMP).

* * * * *